(12) United States Patent
Terasawa et al.

(10) Patent No.: US 7,517,821 B2
(45) Date of Patent: Apr. 14, 2009

(54) AUTOMOBILE INTERIOR BOARD AND METHOD OF PRODUCING AUTOMOBILE INTERIOR BOARD

(75) Inventors: Isamu Terasawa, Toyota (JP); Kazunori Tsuneoka, Obu (JP); Hiroshi Kimura, Okazaki (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 36 days.

(21) Appl. No.: 11/637,820

(22) Filed: Dec. 13, 2006

(65) Prior Publication Data

US 2007/0149081 A1 Jun. 28, 2007

(30) Foreign Application Priority Data

Dec. 14, 2005 (JP) ............................ P2005-360731

(51) Int. Cl.
*B32B 5/26* (2006.01)
*B32B 5/06* (2006.01)
*B32B 27/40* (2006.01)
*D04H 5/00* (2006.01)

(52) U.S. Cl. ................. 442/389; 442/415; 442/416; 442/381; 442/385; 428/423.7

(58) Field of Classification Search ................. 442/415, 442/416, 381, 385, 389
See application file for complete search history.

(56) References Cited

FOREIGN PATENT DOCUMENTS

JP 2004-284246 A 10/2004

*Primary Examiner*—Lynda Salvatore
(74) *Attorney, Agent, or Firm*—Birch, Stewart, Kolasch & Birch, LLP

(57) ABSTRACT

An automobile interior board includes a base layer; and a nonwoven or woven surface layer, laminated on at least one surface of the base layer. The base layer is comprised of a composite material of: a first fiber, comprised of a bamboo fiber; a second fiber, comprised of one of cotton, hemp and mixture of cotton and hemp; and a biodegradable resin. Weight percentage of the first fiber, the second fiber and the biodegradable resin satisfies a following equation, the first fiber: the second fiber: the biodegradable resin=30 to 70:10 to 60:20 to 60. The surface layer is comprised of one of a PET resin fiber and a natural material-derived fiber.

6 Claims, 4 Drawing Sheets

AUTOMOBILE INTERIOR BOARD AND METHOD OF PRODUCING AUTOMOBILE INTERIOR BOARD

BACKGROUND OF THE INVENTION

The present invention relates to an automobile interior board and more particularly to an automobile interior board obtained by complexing bamboo fiber, natural material-derived fiber and biodegradable fiber with each other.

In recent years, biodegradable products have been noted from the standpoint of protection of global environment, particularly waste disposal. Biodegradable products are advantageous both in convenience of themselves and environmental adaptability for degradation of waste to water, carbon dioxide, etc. by the action of microorganism such as bacteria. The development of various merchandises as automobile interior board such as ceiling substrate have been extensively attempted.

An automobile interior board needs to be sufficiently treated in protection of global environment, particularly waste disposal, be easily produced, cause passengers to have no feeling of physical disorder and show no sagging particularly when used as a ceiling substrate. As such automobile interior boards there can be used the following various fiber-complexed resin products <1> to <5>.

<1>: One obtained by dispersing a thermosetting resin such as phenol resin in a natural fiber such as hemp and cotton as a binder, heat-pressing the dispersion in a mold to form a required roughened shape, setting the shape in a bonding mold with a surface material such as nonwoven cloth and fabric, and then bonding the surface material to the shape with an adhesive.

<2>: One obtained by in-mold foaming a glass fiber-filled foamable PP resin with a surface material such as nonwoven cloth and fabric to form an integrally molded material.

<3>: A molded ceiling substrate having a foamed sandwiched structure having a film layer provided on the both surfaces of a foamable sheet-shaped material such as styrene with an adhesive.

<4>: One including as a core a slab urethane, a glass mat bonded to the both surfaces of the slab urethane with an adhesive, and a surface material such as nonwoven cloth and fabric bonded to the outer side of the glass mat with an adhesive.

<5>: One including as a core an engineering plastic foamable material having a high rigidity such as modified PPO and modified PPE and a surface material such as nonwoven cloth and fabric bonded to the outer side of the engineering plastic foamable material with an adhesive.

An example of related fiber-complexed resin products and producing methods thereof are disclosed in JP-A-2004-284246. JP-A-2004-284246 discloses a fiber-complexed resin product including a base layer having a desired strength attained by a relatively rigid fiber and a surface layer having a smooth surface attained by a relatively flexible fiber. In particular, both first and second fibers are a natural material-derived fiber based on vegetable or animal material and both first and second thermosetting resins are a natural material-derived resin. Both the fiber and resin are biodegradable and thus can be subjected to biodegradation before discarded.

However, when the aforementioned related fiber-complexed resin products are used as automobile interior board, the following problems arise.

The method of producing the fiber-complexed resin product including as a binder a thermosetting resin such as phenol resin as in Clause <1> requires the use of two molds, i.e., mold for molding a substrate having a required roughened shape and bonding mold for bonding a surface material such as nonwoven cloth and fabric to the substrate and hence two steps. It is also required that the molding temperature be not lower than 200° C., at which the thermosetting resin is heat-cured, increasing the temperature and time required for molding and hence the working cost and labor cost. Further, the resulting fiber-complexed resin product contains a large amount of a phenol resin and hence free formaldehyde or phenol that evaporates to give an environmentally unfriendly atmosphere. Moreover, this product can be difficultly recycled at disposal because it is composed of a thermosetting resin.

The molded ceiling substrate as described in Clause <2> must be thick and heavy to obtain a required rigidity. The molded ceiling substrate is also disadvantageous in that the dimensional shrinkage after heat molding is great. Further, since the molded ceiling substrate contains glass fiber, it is attached to the wall of the incinerator when combusted for disposal, giving damage to the incinerator. Moreover, even when the molded ceiling substrate is crushed and melted in an attempt to recycle the molded ceiling substrate, the glass fiber is cut, making it impossible to recycle the molded ceiling substrate.

The molded ceiling substrate as described in Clause <3> is a sheet made of a thermosetting resin foamable material that can be difficultly heated uniformly to the core thereof. Further, the molded ceiling substrate must be heated under severe conditions because the sheet shows drawdown as the temperature rises with heating. This requires an expensive heating device such as high precision temperature controller such as infrastein heater, adding to initial cost. The molded ceiling substrate is also disadvantageous in that the dimensional shrinkage after molding is great. Further, since the molded ceiling substrate contains an organic solvent as a foaming agent, the product contains a slight amount of the organic solvent even after molding, increasing VOC (volatile material) in the automobile cabin and giving an environmentally unfriendly atmosphere.

The fiber-complexed resin product as described in Clause <4> includes urethane as a thermosetting resin and even a glass mat and thus can be practically not recycled. When the fiber-complexed resin product is discarded and combusted, the glass is attached to the wall of the incinerator, giving damage to the incinerator. Further, harmful VOC such as catalyst amine is produced, giving an environmentally unfriendly atmosphere.

The fiber-complexed resin product as described in Clause <5> includes an expensive engineering plastic foamable material that adds to the part cost.

In the foregoing description, the formation of the fiber-complexed resin products as described in Clauses <1>, <3>, <4> and <5> requires the use of a bonding step involving the use of an adhesive and hence a complicated step. Further, all the resin-complexed resin products of <1> to <5> include petroleum-derived materials that cannot be degradated even when discarded for reclamation and cause an environmental problem involving the rise of carbon dioxide on the earth even when combusted.

SUMMARY

It is therefore an object of the invention to provide an automobile interior board which can be sufficiently treated in protection of global environment, particularly waste disposal, can be easily produced, cause passengers to have no feeling of physical disorder and show no sagging particularly when used as a ceiling substrate and a method of producing a automobile interior board.

DETAIL DESCRIPTION OF PREFERRED EMBODIMENTS

Figure 1:
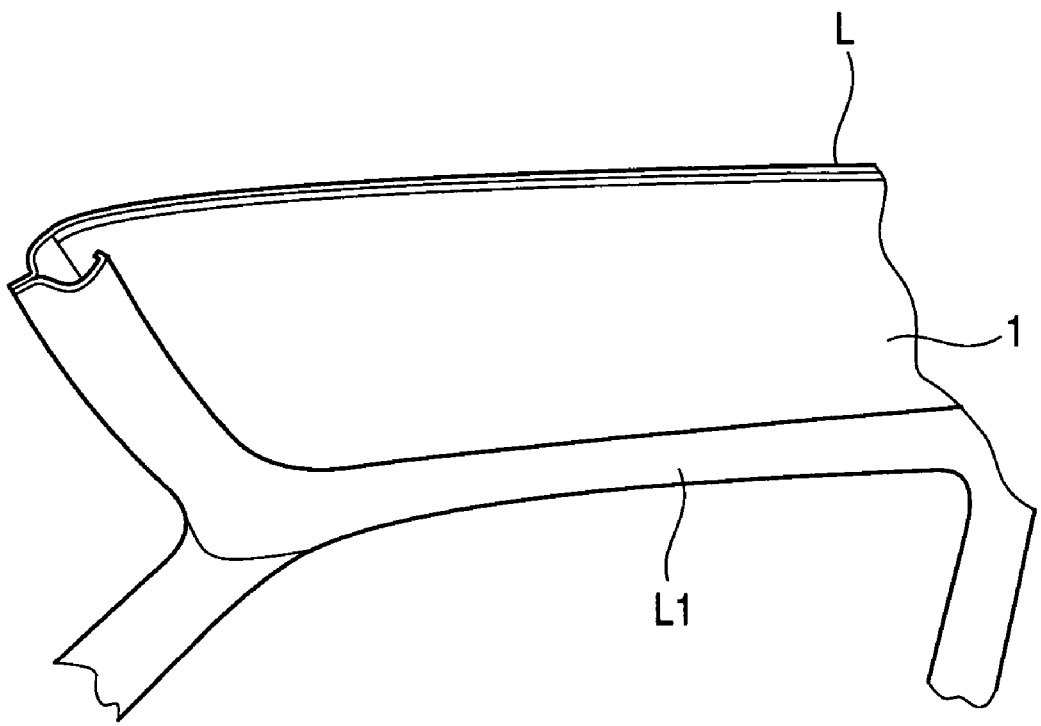
FIG. 1 is a cutaway perspective view illustrating a state in which a ceiling substrate to which an automobile interior board as an embodiment of the invention is applied is mounted on a vehicle.
Figure 2A:
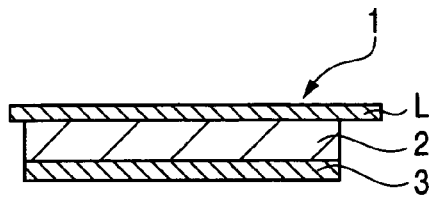
FIG. 2A is a cutaway enlarged sectional view of a part of the ceiling substrate of FIG. 1

FIG. 1 shows a ceiling base 1 to which the automobile interior board of the invention is applied and FIG. 2A shows the sectional structure of the ceiling base 1.

The ceiling base 1 includes an upper surface superimposed and bonded to the inner wall surface of a roof 1 covering the upper portion of the cabin and a periphery clamped by forward, rear, right and left roof rails L1 and the inner wall surface of the roof L.

Figure 2B:
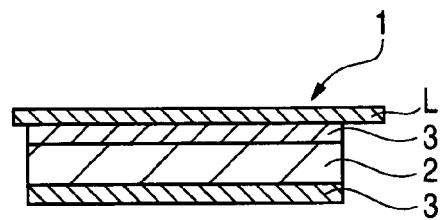
FIG. 2B is a cutaway enlarged sectional view of a part of a modification of the ceiling substrate of FIG. 1.

As shown in FIG. 2A, the ceiling base 1 includes a base layer 2 the upper surface of which is bonded to the inner wall surface of the roof L and a surface layer 3 laminated on the lower surface of the base layer 2 to form an integrated board. In some cases, the base layer 2 may have a surface layer 3 provided on the both sides thereof as shown in FIG. 2B.

The base layer 2 shown in FIG. 2A is in the form of a bulky felt made of a composite material of a first fiber obtained from bamboo yarn-shaped fiber (hereinafter simply referred to as "bamboo fiber"), a second fiber which is cotton, hemp or mixture of cotton and hemp (hereinafter referred to as "cotton or hemp fiber"), and a biodegradable resin.

As the bamboo fiber that is the first fiber there is used fiber obtained by fiberizing bamboo using a fiberizer or fiber obtained from bamboo which has been subjected to boiling or blasting. Alternatively, there may be used a fiber obtained from a solution obtained by dipping bamboo in a weak alkali so that the pulp of bamboo is dissolved.

Cotton or hemp fiber that is the second fiber is obtained by fiberizing used clothing made of cotton or hemp by using a fiberizer.

As the biodegradable resin there is used a polybutylene succinate-based resin (hereinafter referred to as "PBS resin"). A polylactide resin may be used instead of PBS resin.

The base layer 2 needs to include 30 wt-% or more of bamboo fiber, 10 wt-% or more of cotton or hemp fiber and 20 wt-% or more of PBS resin fiber. In this arrangement, the rigidity of the base layer 2 as ceiling substrate can be assured.

Figure 3A:
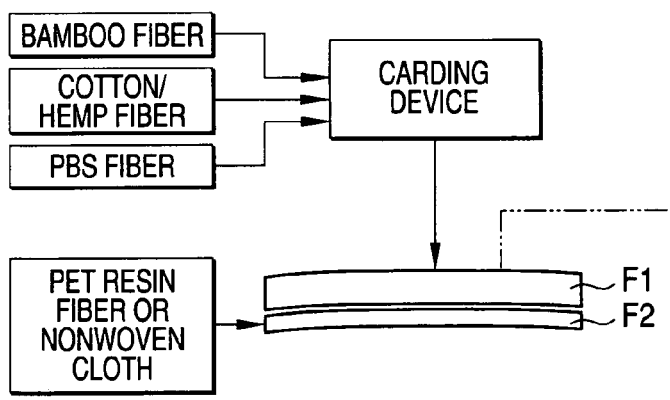
FIGS. 3A to 3D are diagrams illustrating a first step of forming the ceiling substrate of FIG. 1.
Figure 5:
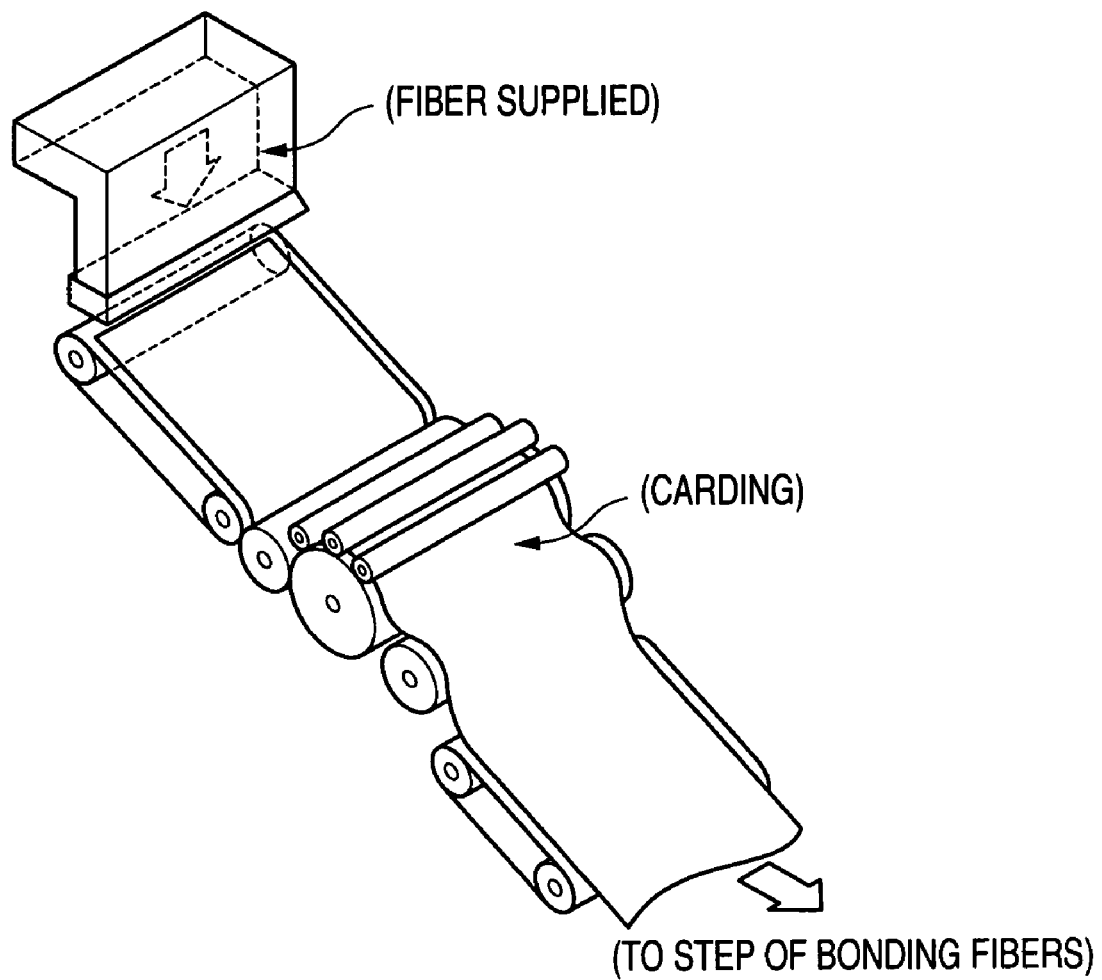
FIG. 5 is a schematic perspective view of a carding device for use in the implementation of a dry fiber lamination method during the step of forming the ceiling substrate of FIG. 1.

Prior to the formation of the base layer 2, the aforementioned "cotton, hemp fiber or mixture thereof", "bamboo fiber" and "PBS fiber" are subjected to a dry fiber lamination method using an airlay, card (as exemplified in FIG. 5), fleece, blender, layer or the like so that they are blended and formed into a bulky felt F1 having a constant thickness (see FIG. 3A).

Referring to the mixing ratio of components in the bulky felt F1, the bulky felt needs to include 30 wt-% or more of bamboo fiber, 20 wt-% or more of PBS resin fiber and 10 wt-% or more of cotton, hemp or mixture thereof. The mixing ratio (wt-%) of these components is set to fall within the range represented by the following formula (1).

First fiber:Second fiber:PBS resin fiber=30 to 70:10 to 60:20 to 60     (1)

The basis for the setting of this mixing ratio (wt-%) will be described hereinafter.

Referring first to the reason why 30 wt-% or more of bamboo fiber is needed, it is necessary that an elastic modulus of 600 MPa or more be assured to prevent the bulky felt from sagging when used as ceiling substrate 1. Referring to the reason why 20 wt-% or more of PBS resin fiber is needed, this amount of PBS resin fiber is needed to bond bamboo fiber, cotton fiber and hemp fiber to each other and smoothen the surface of the board.

Referring to the reason why 10 wt-% or more of cotton, hemp or mixture thereof is needed, this amount of such a fiber is needed to assure desired handleability of the bulky felt F1 during formation. In some detail, when only bamboo fiber is used, the resulting bulky felt exhibits so remarkably poor handleability that it is cracked to pieces when handled by hands, causing the deterioration of workability. Further, this amount of such a fiber is needed to assure desired deep-drawnability during heat press. Bamboo fiber has as relatively large a diameter as 50 μm to 500 μm as compared with cotton or hemp fiber and, when heat deep-drawn, can protrude beyond the surface of the bulky felt to give roughness. Accordingly, when cotton or hemp fiber is incorporated in the bulky felt, an effect can be exerted of inhibiting the occurrence of roughness to prevent passengers from having any feeling of physical disorder when they touch the surface of the ceiling.

From the aforementioned standpoints of view, the mixing ratio of the components in the bulky felt F1 before the formation of the base layer 2 is set to fall within the range (1). In order to auxiliarily enhance the elastic modulus, talc-containing PBS resin may be used and the diameter of bamboo fiber may be reduced accordingly.

The surface layer 3 laminated on the lower surface of the base layer 2 as shown in FIG. 3A will be described hereinafter.

On the lower surface of the base layer bulky felt F1 which is ready to form the base layer 2 is laminated a surface nonwoven cloth or woven cloth F2 which is ready to form a surface layer 3 made of a nonwoven cloth or woven cloth (hereinafter referred to as "nonwoven cloth or woven cloth") formed by PET resin fiber or natural material-derived fiber such as bamboo fiber, bamboo rayon fiber, wool and silk. As PET resin fiber there may be used recycled PET resin fiber.

Figure 3B:
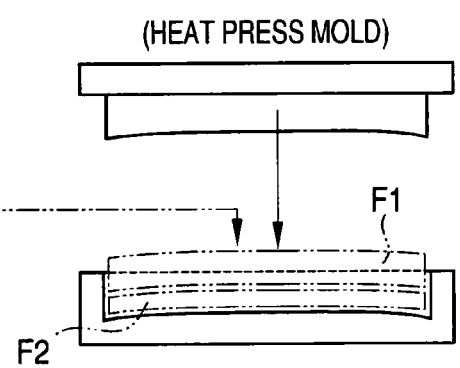
Figure 3C:
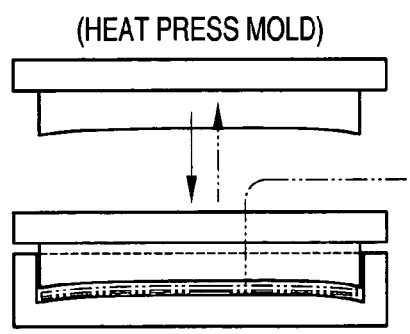
Figure 3D:
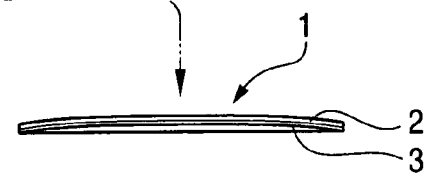

After the surface layer 3 is thus laminated on the lower surface of the base layer 2, the laminate is then put into a heat press mold as shown in FIG. 3B where it is then compressed, heated and cooled to form a ceiling substrate 1 as shown in FIGS. 3C and 3D.

During heating, PBS resin fiber is melted to exhibit adhesion by which the fibers in the base layer 2 and the surface layer 3 are then compressed and bonded to each other at the cooling step to form a board.

During this procedure, PBS resin fiber is melted to exhibit adhesion by which the cotton fiber or hemp fiber in used clothing, bamboo fiber and PBS resin fiber are bonded to each other to form a board and bonded to nonwoven cloth or woven cloth.

PBS resin fiber to be used herein is biodegradable and hydrolyzable. Therefore, PBS resin fiber is undesirable from the standpoint of inhibition of strength drop due to deterioration of the product with time. It is thus preferred that PBS resin fiber which has been blocked at the terminals thereof or otherwise processed to have minimized biodegradability and hydrolyzability. When PBS resin fiber is thus processed, the resulting board can retain a tensile strength of 50% or more after 900 hours of ageing at 70° C.-95% RH when used as ceiling substrate 1 which is one of automobile interior parts.

The ceiling substrate 1 has bamboo fiber incorporated in the base layer 2 in an amount of from 30 to 70% by weight and thus can be certainly prevented from sagging. Since PBS resin fiber can be firmly bonded to PET resin fiber or natural material-derived fiber such as bamboo fiber, bamboo rayon fiber, wool and silk and thus cannot be peeled off these fibers, the resulting ceiling substrate can retain its shape retention sufficiently to allow easy formation of deep-drawn three dimensional shape, assuring desired durability as ceiling material.

The ceiling substrate 1 can be complexed with a nonwoven cloth or woven cloth by the adhesion of PBS resin to form a board. During this procedure, the adhesion of PBS resin fiber is used, eliminating the necessity of separate adhesive. Further, PBS resin can be firmly bonded to PET resin fiber or natural material-derived fiber such as bamboo fiber, bamboo rayon fiber, wool and silk and thus cannot be peeled off these fibers.

The ceiling substrate 1 can be produced free of petroleum-derived material and thus is environmentally friendly. In other words, when cotton fiber and hemp fiber which are recycled from used clothing, natural fiber such as bamboo fiber and PET resin fiber are used, the resulting ceiling substrate 1 is entirely composed of recycled materials and natural material-derived materials. Further, the ceiling substrate 1 is free of harmful materials such as solvent, phenol and formaldehyde and thus is environmentally friendly.

The use of a terminally-blocked PBS resin and a biodegradable resin fiber which is a polylactide resin makes it possible to suppress biodegradation and hydrolysis. Thus, the deterioration of the board can be suppressed at least when it is used as ceiling substrate 1 for automobile. Accordingly, the board can be prevented from sagging and thus can be stably used as a ceiling material.

While the foregoing description has been made with reference to the case where the heat press molding in a heat press mold is carried out by simultaneously compressing/heating and cooling the base layer 2 and the surface layer 3 laminated on the lower surface thereof, i.e., surface nonwoven cloth or woven cloth layer F2 laminated on the lower surface of the bulky felt F1 to form a board, heat press molding may be effected as shown in FIGS. 4A to 4D.

Figure 4A:
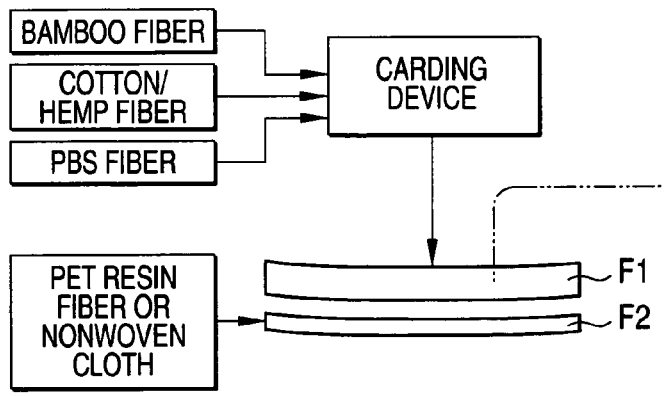
FIGS. 4A to 4D are diagrams illustrating a second step of forming the ceiling substrate of FIG. 1.
Figure 4B:
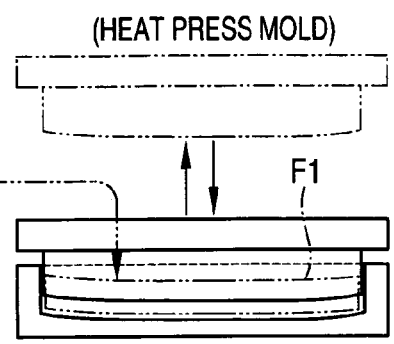
Figure 4C:
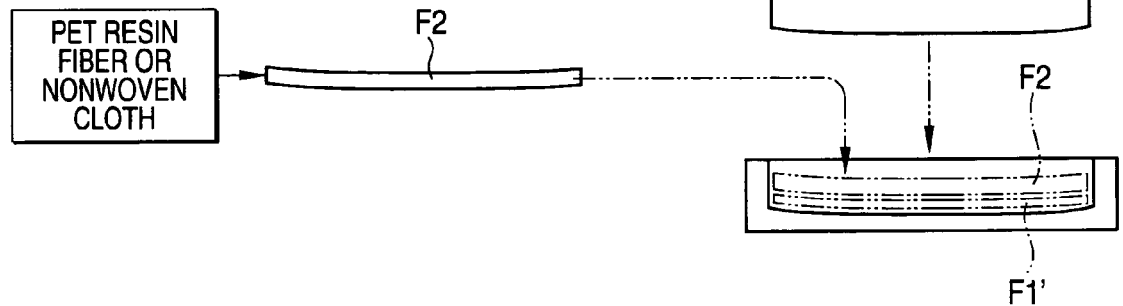
Figure 4D:
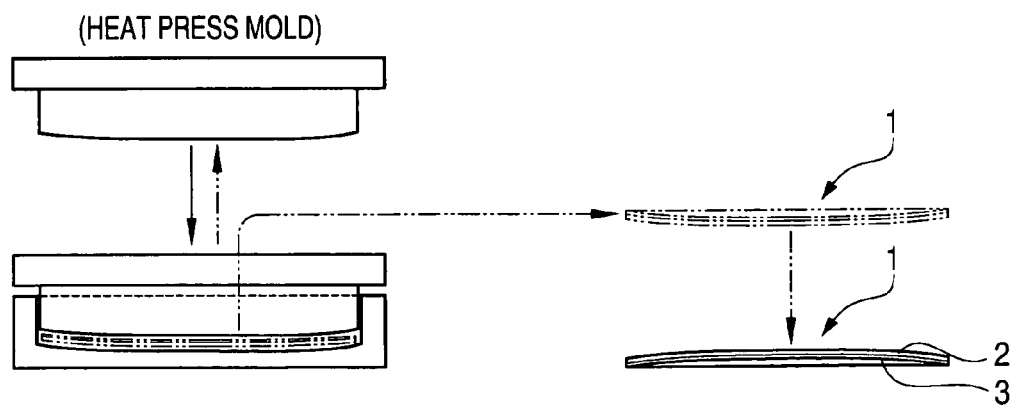

In this case, the heat press molding using heat press mold involves compression of the bulky felt F1 for base layer 2 under a high pressure to form a board (base layer board F1') at a first heat press step shown in FIG. 4B, followed by release of compression and mold opening as shown in FIG. 4C. Subsequently, the heating temperature is changed to lower temperature side. A nonwoven cloth or woven cloth F2 is laminated on the base layer board F1'. As shown in FIG. 4D, the surface nonwoven cloth or woven cloth F2 laminated on the base layer board F1' is heat-pressed at a second press step at least one of heating temperature and compression force of which is predetermined lower than that of the first heat press step so that the resulting adhesion of PBS resin fiber is used to bond the base layer 2 and the surface layer 3 to each other, particularly making it possible to prevent the collapse of nonwoven cloth or woven cloth which is the surface layer 3.

Alternatively, a production step may be used which includes forming only a base layer 2 as a board, heating only the surface of the base layer board 2 with hot air or far-infrared ray, and then lightly pressing the nonwoven cloth or woven cloth which is the surface layer 3 against the base layer board 2 so that they are stuck to the base layer board 2 with the adhesion of PBS resin fiber.

The invention will be further described in the following examples, but the invention is not limited thereto.

EXAMPLE

Inventive automobile interior boards and comparative automobile interior boards were produced and compared with each other in mechanical properties.

Example 1

Using the steps of FIGS. 3A to 3D, inventive fiber-complexed resin products were produced under the following conditions (1) to (6).
(1) Used clothing woven by cotton or hemp is fiberized by a fiberizer.
(2) Bamboo is fiberized by a fiberizer.
(3) Using a blender, a card and a layer, the aforementioned fibers and PBS resin fiber are blended to form a bulky felt having a predetermined thickness.

PBS resin fiber: GS P1a, produced by Mitsubishi Chemical Corporation; grade:

AZ71T; diameter: 5.5 dtex; length: 2 inch

Length of bamboo fiber: 20 to 130 mm; diameter: 50 to 500 μm

Bamboo fiber:cotton and hemp fiber:PBS resin fiber=30:20:50 (wt-%)
(4) A nonwoven cloth of recycled PET fiber is laminated on one surface of the bulky felt. Using a heat press, the laminate is heat-pressed, and then cooled.

Press condition: 130° C., 2 min., pressure: 3 MPa
(5) PBS resin is biodegradable and hydrolyzable but is not desirable as product. Thus, PBS resin is blocked at the terminals thereof to minimize biodegradability and hydrolyzability before use. PBS resin which retains a tensile strength of 50% or more after 900 hours of ageing at 70° C.-95% RH is used.
(6) Cotton fiber or hemp fiber from used clothing, bamboo fiber and PBS resin fiber are bonded to each other to form a board and bonded to nonwoven cloth of recycled PET fiber.

Example 2

Using the steps of FIGS. 3A to 3D, inventive fiber-complexed resin products were produced under the following conditions (1) to (6).
(1) Used clothing woven by cotton or hemp is fiberized by a fiberizer.
(2) Bamboo is fiberized by a fiberizer.
(3) Using a blender, a card and a layer, the aforementioned fibers and PBS resin fiber are blended to form a bulky felt having a predetermined thickness.

PBS resin fiber: GS P1a, produced by Mitsubishi Chemical Corporation; grade:

GZ95T (containing talc as filler); diameter: 5.5 dtex; length: 2 inch

Length of bamboo fiber: 20 to 130 mm; diameter: 50 to 500 μm

Bamboo fiber:cotton and hemp fiber:PBS resin fiber=50:10:40 (wt-%)

(4) A woven hemp cloth is laminated on one surface of the bulky felt. Using a heat press, the laminate is heat-pressed, and then cooled. Press condition: 130° C., 2 min., pressure: 3 MPa
(5) PBS resin is biodegradable and hydrolyzable but is not desirable as product. Thus, PBS resin is blocked at the terminals thereof to minimize biodegradability and hydrolyzability before use. PBS resin which retains a tensile strength of 50% or more after 900 hours of ageing at 70° C.-95% RH is used.
(6) Cotton fiber or hemp fiber from used clothing, bamboo fiber and PBS resin fiber are bonded to each other to form a board and bonded to woven cloth.

Comparative Example 1

Using a known production method, a fiber-complexed resin product of Comparative Example 1 was produced under the following conditions (1) to (5).
(1) Used clothing woven by cotton or hemp is fiberized by a fiberizer.
(2) Using a blender, a card and a layer, the aforementioned fibers and a phenol resin powder are blended to form a bulky felt having a predetermined thickness.

Phenol resin powder: novolac type phenol resin (produced by Asahi Organic Chemicals Industry Co., Ltd.)

Cotton and hemp fiber:phenol resin powder=70:30 (wt-%)
(3) Using a heat press, the aforementioned mixture is heat-pressed, and then cooled. Press condition: 230° C., 40 seconds, pressure: 15 MPa
(4) Cotton fiber or hemp fiber from used clothing and phenol resin powder are bonded to each other to form a board.
(5) The board thus prepared is coated with a PE-based hot melt adhesive, and then stuck to a nonwoven cloth of recycled PET fiber.

Comparative Example 2

Using a known production method, a fiber-complexed resin product of Comparative Example 2 was produced under the following conditions (1) to (5).
(1) Used clothing woven by cotton or hemp is fiberized by a fiberizer.
(2) Using a blender, a card and a layer, the aforementioned fibers and PBS resin fiber are blended to form a bulky felt having a predetermined thickness.

PBS resin fiber: GS P1a, produced by Mitsubishi Chemical Corporation; grade:

AZ71T; diameter: 5.5 dtex; length: 2 inch

Cotton and hemp fiber:PBS resin fiber=50:50 (wt-%)
(3) A nonwoven cloth of recycled PET fiber is laminated on one surface of the bulky felt. Using a heat press, the laminate is heat-pressed, and then cooled.

Press condition: 130° C., 2 min., pressure: 3 MPa
(4) PBS resin is biodegradable and hydrolyzable but is not desirable as product. Thus, PBS resin is blocked at the terminals thereof to minimize biodegradability and hydrolyzability before use. PBS resin which retains a tensile strength of 50% or more after 900 hours of ageing at 70° C.-95% RH is used.
(5) Cotton fiber or hemp fiber from used clothing, bamboo fiber and PBS resin fiber are bonded to each other to form a board and bonded to nonwoven cloth of recycled PET fiber.

Comparative Example 3

Using a known production method, a fiber-complexed resin product of Comparative Example 3 was produced under the following conditions (1) to (5).
(1) Bamboo is fiberized by a fiberizer.
(2) Using a blender, a card and a layer, the aforementioned fibers and PBS resin fiber are blended to form a bulky felt to a predetermined thickness.

PBS resin fiber: GS P1a, produced by Mitsubishi Chemical Corporation; grade:

AZ71T; diameter: 5.5 dtex; length: 2 inch

Length of bamboo fiber: 20 to 130 mm; diameter: 50 to 500 μm

Bamboo fiber:PBS resin fiber=50:50 (wt-%)
(3) A nonwoven cloth of recycled PET fiber is laminated on one surface of the bulky felt. Using a heat press, the laminate is heat-pressed, and then cooled.

Press condition: 130° C., 2 min., pressure: 3 MPa
(4) PBS resin is biodegradable and hydrolyzable but is not desirable as product. Thus, PBS resin is blocked at the terminals thereof to minimize biodegradability and hydrolyzability before use. PBS resin which retains a tensile strength of 50% or more after 900 hours of ageing at 70° C.-95% RH is used.
(5) Cotton fiber or hemp fiber from used clothing, bamboo fiber and PBS resin fiber are bonded to each other to form a board and bonded to nonwoven cloth of recycled PET fiber.

The data of the Examples 1 and 2 and Comparative Examples 1, 2 and 3 are set forth in Table 1 and Table 2 for comparison.

TABLE 1

| Properties | Flexural strength MPa | Flexural modulus MPa | Sagging | Percent heat insulation | Air permeability CC | Surface adhesivity | Total VOC mg/10 kcal | Formaldehyde μg/10 kcal |
|---|---|---|---|---|---|---|---|---|
| Exa. 1 | 11.2 | 799 | None | 62% | 1.0 or less | Fracture of surface layer | 1.00 | 0.11 |
| Exa. 2 | 13.3 | 1,350 | None | 62% | 1.0 or less | Fracture of surface layer | 1.60 | 0.18 |
| Com. Exa. 1 | 13.2 | 1,421 | None | 62% | 1.0 or less | Fracture of surface layer | 47.0 | 1.00 |
| Com. Exa. 2 | 8.0 | 520 | Some | 61% | 1.0 or less | Fracture of surface layer | None | None |
| Com. Exa. 3 | 12.8 | 1,306 | None | 62% | 1.0 or less | Fracture of surface layer | 1.60 | 0.18 |

TABLE 2

| Properties | Odor | Recycled material + natrual material-derived product | Adehisive used? | Handleablity of bulky mat | Surrace roughness | Deep-drawnability |
|---|---|---|---|---|---|---|
| Exa. 1 | Class 1 | Yes | No | Good | Good | Good |
| Exa. 2 | Class 1 | Yes | No | Good | Good | Good |
| Com. Exa. 1 | Class 3 | 30 wt-% of phenol resin incorporated | Yes | Good | Good | Good |
| Com. Exa. 2 | Class 1 | Yes | No | Good | Good | Good |
| Com. Exa. 3 | Class 1 | Yes | No | Poor | Poor | Poor |

The item "Surface adhesivity" in Table 1 shows the results of the surface layer-peeling test. In order to confirm the adhesivity between the board and the surface layer, after the board to which the surface layer is adhered has been made, the surface layer is peeled off. If the surface layer is fractured when the surface layer is peeled off, it has been decided that it has the sufficient adhesivity and "fracture of surface layer" is recorded on the item in Table 1.

As a result, the products of Examples 1 and 2 included bamboo fiber incorporated in the base layer 2 to show sufficient shape retention and thus exhibited sufficient value of mechanical strength such as flexural strength, flexural modulus and sagging as ceiling substrate 1. Further, these products had no problems of deep-drawnability as ceiling substrate 1. Moreover, the handleability of bamboo fiber during working was improved by the use of cotton fiber or hemp fiber obtained from used clothing. Further, these products had no odor problems as ceiling substrate 1. When used as a ceiling, these products showed no surface roughness. The passengers had no feeling of physical disorder when they touch the ceiling. These products are particularly advantageous in that they include PBS resin fiber, which is a biodegradable resin fiber, incorporated therein as a binder and a recycled material and a natural material-derived fiber incorporated therein, giving an environmentally friendly atmosphere.

On the other hand, the product of Comparative Example 1 showed relatively much generation of formaldehyde and total VOC and included a binder made of phenol resin (thermosetting resin). This phenol resin binder impairs the biodegradability characteristic to cellulose-based fibers (cotton fiber or hemp fiber obtained from used clothing) to render the fiber-based board nonbiodegradable, deteriorating recyclability. Accordingly, the bonding of the surface layer to the base layer requires the use of an adhesive, adding to working cost.

Further, the product of Comparative Example 2 lacks bamboo fiber and thus exhibits deterioration in mechanical strength such as flexural modulus and sagging. Thus, the product of Comparative Example 2 is not suitable for ceiling substrate 1.

Moreover, the product of Comparative Example 3 has no cotton or hemp incorporated in bamboo fiber. Thus, when only the bamboo fiber is formed into a bulky felt, it exhibits a poor handleability that takes much trouble to work, adding to forming cost. Further, when used as ceiling, the product of Comparative Example 3 shows a relatively surface roughness that causes the passengers to have a feeling of physical disorder such as ruggedness when touched.

While the foregoing description has been made with reference to the ceiling substrate 1 as automobile interior board, the invention can be applied also to interior boards such as automobile trunk lid. In this case, too, the same effect as that of the automobile interior board of FIG. 1 can be exerted.

What is claimed is:

1. An automobile interior board comprising:
a base layer; and
a nonwoven or woven surface layer, laminated on at least one surface of the base layer, wherein
the base layer is comprised of a composite material of:
a first fiber, comprised of a bamboo fiber;
a second fiber, comprised of one of cotton, hemp and mixture of cotton and hemp; and
a biodegradable resin,
weight percentage of the first fiber, the second fiber and the biodegradable resin satisfies a following equation, the first fiber: the second fiber: the biodegradable resin=30 to 70:10 to 60:20 to 60, and
the surface layer is comprised of one of a PET resin fiber and a natural material-derived fiber.

2. The automobile interior board according to claim 1, wherein
the biodegradable resin includes a polybutylene succinate-based resin.

3. The automobile interior board according to claim 1, wherein
the biodegradable resin is blocked at terminals thereof.

4. The automobile interior board according to claim 1, which is an automobile ceiling substrate.

5. A method of producing the automobile interior board according to claim 1, comprising:
subjecting the first fiber, the second fiber and the biodegradable resin to a dry fiber lamination method to form the base layer having a felt shape having a predetermined thickness;
laminating the surface layer on at least one surface of the base layer; and
heat-pressing the base layer and the surface layer so that adhesion force generated by heating and compression force causes the biodegradable resin to bond fibers of the base layer and fibers of the surface layer to each other to form a composite board having a predetermined shape.

6. A method of producing the automobile interior board according to claim 1, comprising:
subjecting the first fiber, the second fiber and the biodegradable resin to a dry fiber lamination method to form the base layer having a felt shape having a predetermined thickness;
subjecting the base layer to a first heat press to form a base layer board;
laminating a nonwoven or woven surface layer comprised of one of a recycled PET resin fiber and a natural material-derived fiber on at least one surface of the base layer board; and
subjecting the base layer board and the surface layer to a second heat press at least one of heating temperature and compression force of which is lower than that of the first heat press so that adhesion force generated by heating and compression force causes the biodegradable resin to bond fibers of the base layer board and fibers of the surface layer to each other to form a composite board having a predetermined shape.

* * * * *